UNITED STATES PATENT OFFICE.

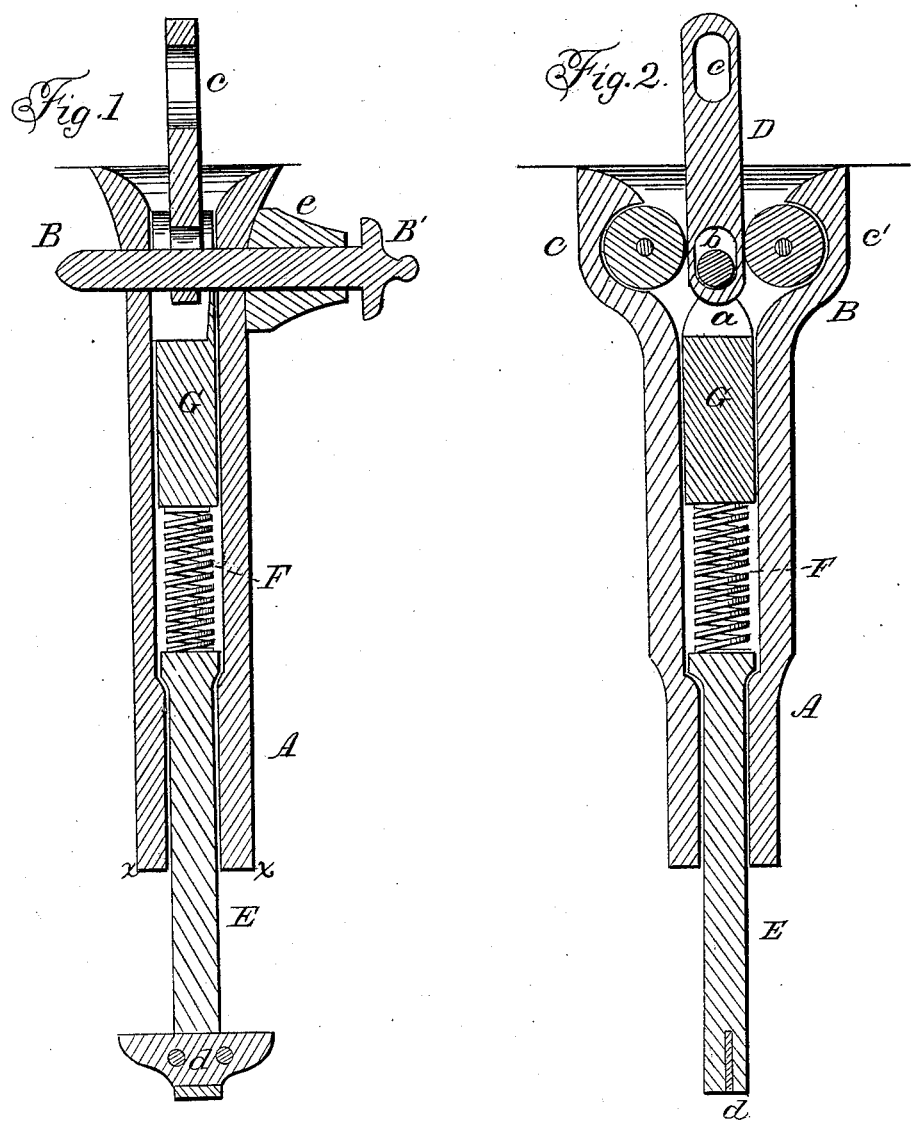

JOHN BESTWICK, JR., AND A. ALDEN, OF DEDHAM, MASSACHUSETTS.

CAR-COUPLING.

Specification of Letters Patent No. 27,516, dated March 20, 1860.

*To all whom it may concern:*

Be it known that we, JOHN BESTWICK, Jr., and ABNER ALDEN, of Dedham, in the county of Norfolk and State of Massachusetts, have invented a new and Improved Car-Coupling; and we hereby declare that the following is a full and exact description, reference being had to the annexed drawings, making a part of this specification.

The nature of the invention being restricted to the construction of the coupling will be best understood by the detail of the description.

Let Figure 1, represent a vertical section through the length of the coupling and in the same plane with the axis of pin B. Fig. 2, represents a horizontal longitudinal section of the same.

Let A represent the shell or external part of the coupling; B, the pin in the expanded head; B', the head of the pin; C C' the rubber cylinder springs; D, the link, one end of which is attached to this coupling piece by means of pin B, while the other is attached to the next car on the same track.

E, represents an iron rod or bar made fast in any suitable manner within the shell A, and is designed to be stationary and firmly attached to the car next in the rear and fastened by key, d.

F is a spiral spring made fast to E, and acting against sliding piston G, for preventing concussion during the coupling of two cars together.

(d) represents the key or hook which holds the iron bolt or bar E fast to the car.

(b) is the hole through one extremity of the link; (c), the hole through the opposite end of the link.

(a) represents the blunt end of piston G, which receives the end of link D, and recedes sufficiently to allow the hole (b) in the link to correspond with that in the solid part of the shell, so that the pin, B, may be passed directly through the whole coupling.

The india-rubber cylinders or cushions c, c', are received into corresponding recesses in the shell, as shown in Fig. 2, and are sustained in their place by means of axis pins, and act as guides for directing the link D to its place in the operation of coupling the cars together. These cylinders rotate freely on their axis in the operation of pushing link D, between them. At the same time the plunger, G, yields sufficiently to prevent the parts from suffering by concussion, when the link is received into its place. At the time the link strikes the part (a) with force, the hole in the link may be carried beyond that in the corresponding part of the shell A; but the spiral spring reacting forces the link into the position in which both holes correspond and the pin B readily drops into its place. The rubber cylinders, act, first, as a yielding cushion in case the link does not enter the space in the middle; and, second, they act as guides by easily rotating on their axes by any force that presses upon them; third, they pinch sufficiently upon the link to steady it and hold it in place while the pin B is being dropped into its place by its own gravity.

The operation is performed as follows: If the link D be withdrawn from the opening and pin B as seen in Fig. 1 be raised out of its place, piston G will be forced out by the spring, F, till the inclined projection (a) shall entirely cover the pin hole in A, and prevent the pin B from passing through it. But if, while the pin be resting on the projection (a), the link D, with the car to which it belongs be brought near, so that the link shall enter the space between the rollers, piston G is pushed back and uncovers the hole (b) when the pin B by its own gravity falls into its place and the coupling is completed.

There has frequently occurred much difficulty in operating self shackling car couplings from the fact that most of the operating parts are exposed to accident being external. In the present case however the spring is inclosed within the shell A and between piston G, and bar E, and is thus entirely protected from the effect of blows or other accidents arising from exposure of the parts.

We wish it to be distinctly understood that we do not claim to have invented the first self shackling car coupling, nor do we claim the piston, nor the spring, nor the pin, nor the link, as new parts of a car coupling, knowing that they are already known; but, Having described the construction and operation of the car coupling, we claim—

The combination of the rotating rubber cylinders C, and C' for directing and controlling link D substantially as described.

JOHN BESTWICK, JR.
ABNER ALDEN.

Witnesses:
SYLVENUS WALKER,
JOHN J. PRESCOTT.